(12) United States Patent
Kincaid

(10) Patent No.: US 6,758,193 B1
(45) Date of Patent: Jul. 6, 2004

(54) SUPER-CHILLED AIR INDUCTION SYSTEM

(76) Inventor: Joseph C. Kincaid, 9512 Sierra Vista Ct. NE., Albuquerque, NM (US) 87111

( * ) Notice: Subject to any disclaimer, the term of this patent is extended or adjusted under 35 U.S.C. 154(b) by 5 days.

(21) Appl. No.: 10/331,752

(22) Filed: Dec. 30, 2002

(51) Int. Cl.[7] .............................................. F02B 29/04
(52) U.S. Cl. ....................... 123/542; 123/540
(58) Field of Search ................... 123/542, 563, 123/540

(56) References Cited

U.S. PATENT DOCUMENTS

| | | | |
|---|---|---|---|
| 4,236,492 A | 12/1980 | Tholen | 123/119 |
| 4,317,439 A | 3/1982 | Emmerling | 123/563 |
| 4,539,815 A | 9/1985 | Garcea | 60/599 |
| 4,665,714 A | 5/1987 | Keller | 62/401 |
| 4,693,084 A | 9/1987 | Ahrens | 60/599 |
| 4,708,120 A | 11/1987 | Mann | 123/563 |
| 5,072,698 A | 12/1991 | Fujihira et al. | 123/52 |
| 5,547,019 A | 8/1996 | Iacullo | 165/51 |
| 5,669,363 A | 9/1997 | Francis | 123/563 |
| 5,871,001 A | 2/1999 | Pelkey | 123/542 |
| 6,247,460 B1 | 6/2001 | Lindberg et al. | 123/563 |
| 6,311,676 B1 | 11/2001 | Oberg et al. | 123/563 |
| 6,314,949 B1 * | 11/2001 | DeGrazia et al. | 123/542 |
| 6,394,076 B1 * | 5/2002 | Hudelson | 123/540 |
| 6,622,710 B2 * | 9/2003 | Hasegawa et al. | 123/563 |

OTHER PUBLICATIONS

Loh et al. Investigation into the use of Thermoelectric Devices as Heat Source for Heat Sink Characterization, Mesa Arizona.

* cited by examiner

Primary Examiner—Marguerite McMahon
(74) Attorney, Agent, or Firm—Ray R. Regan (57) ABSTRACT

A super-chilled air induction apparatus includes a thermoelectric cooling device. The thermoelectric cooling device includes a passage for conducting air. A valve is provided to regulate the flow of cold air from the apparatus into a fuel-air mixture. A heat sink is positioned adjacent the cooling device to contribute to lowering air temperature in the apparatus. An insulator is included for maintaining the cold air temperature with in the cooling device. A temperature gauge allows an operator to determine the air temperature in the thermoelectric cooling device, and a controller allows the operator to control discharge of the super-chilled air into an air-fuel mixture.

42 Claims, 9 Drawing Sheets

SUPER-CHILLED AIR INDUCTION SYSTEM

FIELD OF THE INVENTION

The present invention pertains generally to internal combustion engines. More particularly, the new and useful invention claimed in this document pertains to a super-chilled air induction system for reducing air temperature in an air-fuel mixture during operation of an internal combustion engine. The present invention is particularly, but not exclusively, useful for increasing both horsepower and torque produced by an internal combustion engine.

BACKGROUND OF THE INVENTION

Motor vehicle engine power may be increased by providing a denser than normal air-fuel mixture to the cylinders. Denser than normal air-fuel mixtures are more explosive when ignited, resulting in increased power. To address consumer demand for greater engine power, particularly in internal combustion engines, turbo-chargers and superchargers were developed. An object of both turbo-chargers and superchargers is to increase air pressure of the air-fuel mixture before the air-fuel mixture enters the cylinders of an internal combustion engine. To increase air pressure, turbo-chargers and superchargers compress intake air. As is well known, the laws of thermodynamics indicate that increased pressure may induce increased heat in the air-fuel mixture. However, as also is known, a cool air-fuel mixture is more explosive because the component molecules of cooler than normal air for the air-fuel mixtures are denser than comparatively warmer air-fuel mixtures; the more explosive the air-fuel mixture, the greater the resultant power.

Accordingly, to enhance power from an engine it is desirable to cool intake air, whether processed by a turbo-chargers, supercharger, or other devices, before the pressurized air is delivered to the point of ignition. The term "point of ignition" as used in this document contemplates the ignition of air in a cylinder after air has been admitted through an intake manifold and ultimately delivered to the cylinder. A variety of heat exchangers has been developed to assist in lowering air intake temperatures, including radiators in water-cooled engines, oil or oil bath coolers, intercoolers, and as indicated, turbo-chargers and superchargers. As used in this document, the term "heat exchanger" means at least a device in which heat transfer takes place between two or more fluids that are at different temperatures. Traditional heat exchangers transfer heat from a liquid coolant to the atmosphere; intercoolers, however, may also use a gas as the liquid, such as air, as a cooling medium. Peripheral power-increasing advantages may also accrue by use of intercoolers, including comparatively higher compression ratios and more aggressive spark timing.

What has been lacking, however, until the present invention, and what the industry long has sought, is a device that optimizes the temperature of an air-fuel mixture at the point of ignition so as to produce maximum power from an air-fuel,charge.

In prior approaches, various means for cooling air for an air-fuel mixture have been used or suggested. As indicated, intercoolers have been suggested. However, intercoolers presently available consistently produce neither predictable temperature decreases nor predictable temperatures of a given air-fuel mixture. The amount of cooling provided by intercoolers is dependent on the size of the intercooler, ambient temperature, and similar considerations. As is known, the capacity of any heat pump is strongly dependent on outside air temperature.

In addition, limitations are evident in prior engine air cooling apparatus using thermoelectric devices to cool air. In addition, limitations are evident in prior engine air cooling apparatus using thermoelectric devices to cool air for an air-fuel mixture. Limitations of prior efforts to use thermoelectric devices to cool intake air include requirements to combine thermoelectric devices in devices that also require additional coolants, such as anti-freeze fluids, to be present in the apparatus.

In addition, earlier efforts to cool air for use in an air-fuel charges are limited by the absence of insulation to prevent and control loss of low temperature prior to infusion of the cooled air to the point of ignition.

Therefore, a previously unaddressed need exists in the industry for a new, useful and improved super-chilled air induction system, and method for manufacturing a super-chilled air induction system, that is capable of delivering on demand optimally cooled air-fuel mixtures for greater power. Particularly, there is a significant need for a super-chilled air induction system that produces optimal temperature of an air-fuel mixture at the point of ignition so as to produce maximum power and torque from an air-fuel charge.

SUMMARY OF THE INVENTION

Given conventional solutions for attempting to solve problems associated with apparatus for cooling air-fuel mixtures in motor vehicle engines, it would be desirable, and of considerable advantage, to provide a super-chilled air induction system that delivers optimally cooled air-fuel mixtures to achieve increased power.

The super-chilled air induction system of the present invention provides numerous advantages over existing apparatus, advantages highly desired by the industry. At least one advantage of the present invention is that it uses high-powered thermoelectric cooling devices to help assure delivery of cool air to the intake manifold or manifolds.

Another advantage of the present super-chilled air induction apparatus and system is the use of low thermal resistance heat sinks to assist in dissipating heat from the apparatus and system.

Yet another advantage of the present invention derives from the fact that the apparatus is enclosed to minimize temperature increases and maintain cold air temperature.

Still another advantage of the invention arises from the insulation provided to further reduce heat loss of the cooled air by heat prior to delivery of the cooled air to the point of ignition.

The super-chilled air induction system also includes components, including a valve, that contribute to controlling both the temperature of air, and the flow of cooled air from the apparatus to the point of ignition, allowing delivery of the coldest air temperature possible at the desired point in time.

The present invention also has the advantage of providing an enclosure in the form of a cover, or enclosure, for the apparatus that is formed to direct air through the apparatus and system to contribute to cooling the operating elements of the invention.

Another advantage of the present invention is its ability to cool air below ambient temperatures without using ice, ice water, antifreeze, or other substances currently required in connection with other apparatus seeking to achieve cooled air for an air-fuel mixture.

The present invention also has the advantage of providing an insulated envelope mounted within a spacing void provided to preserve the temperature of the cooled air from cooling through use of the cooled air at the point of ignition.

Another advantage of the present invention derives from the proper configuration of the thermoelectric devices on the apparatus to avoid converting the thermoelectric devices into heating devices rather than cooling devices.

Still another advantage of the super-chilled air induction system is that it may deployed in any motor vehicle engine, whether naturally aspirated, turbo-charged, supercharged, or otherwise configured to cool air before directing the air to a point of ignition in the engine.

Yet another advantage of the present invention is a super-chilled air induction system, and method for manufacturing a super-chilled air induction system, that respectively are easy to use and to practice, and are cost effective for their intended purposes.

These and other advantages are achieved in the present invention by providing a super-chilled air induction apparatus that includes a thermoelectric cooling device. The thermoelectric cooling device includes a housing, formed with a passage through which air passes, and in which fins may be inserted. Thermoelectric coolers are mounted on the housing, and operably connected to a temperature gauge and a controller that allows a user to control admission of air through the apparatus. A valve is provided for regulating air flow in and through the apparatus. An insulator surrounds at least the thermoelectric cooling device. A heat sink is positioned adjacent the housing to dissipate undesirable heat, and an enclosure is mounted on the apparatus to direct air across the apparatus. The apparatus can be connected to pipes that direct air through the apparatus.

It will become apparent to one skilled in the art that the claimed subject matter as a whole, including the structure of the apparatus, and the cooperation of the elements of the apparatus, combine to result in the unexpected advantages and utilities of the present invention. The advantages and objects of the present invention, and features of such a super-chilled air induction system, will become apparent to those skilled in the art when read in conjunction with the accompanying description, drawing figures, and appended claims.

The foregoing has outlined broadly the more important features of the invention to better understand the detailed description that follows, and to better understand the contribution of the present invention to the art. As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

The novel features of this invention, and the invention itself, both as to structure and operation, are best understood from the accompanying drawing, considered in connection with the accompanying description of the drawing, in which similar reference characters refer to similar parts, and in which:

DESCRIPTION OF A PREFERRED EMBODIMENT

Briefly, the present invention provides a super-chilled air induction apparatus. The super-chilled air induction apparatus of the present invention includes a thermoelectric cooling device. The thermoelectric cooling device includes a housing. The housing is formed with a passage. Fins are insertable into the passage. Thermoelectric coolers are operably attached to the housing, and operably connected to a temperature gauge. At least one valve is provided for regulating air flow in and through the apparatus. Also included is an insulator that surrounds the housing. In addition, a heat sink is positioned adjacent the housing to dissipate undesirable heat. The apparatus may be connected to pipes that direct air through the apparatus. The present invention, therefore, is useful for reducing air temperature in an air-fuel mixture during operation of an internal combustion engine.

The present invention is particularly, but not exclusively, useful for increasing both horsepower and torque produced by an internal combustion engine.

Figure 1:
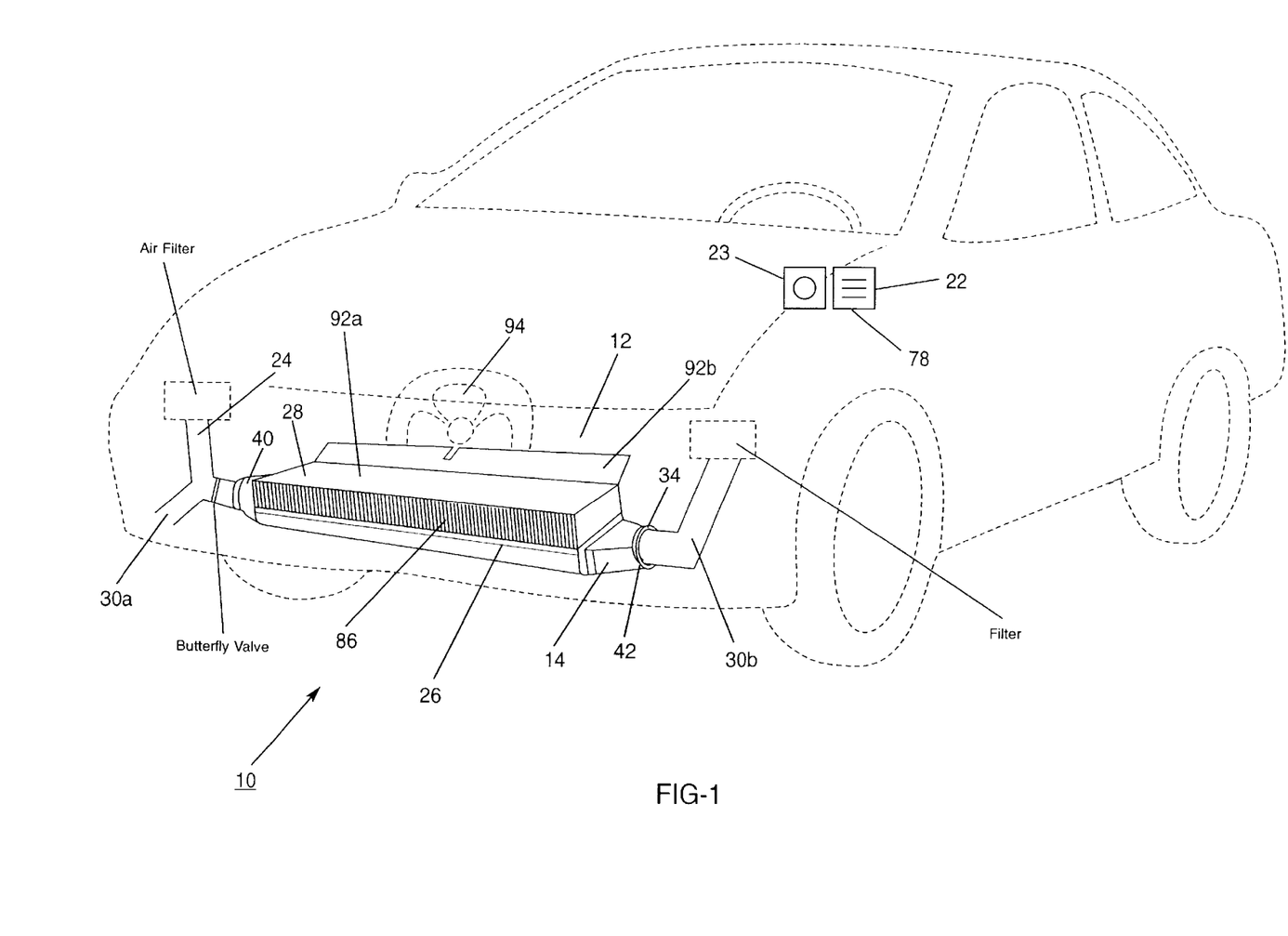
FIG. 1 is a perspective view of the assembled super-chilled air induction apparatus in an operative environment installed on a motor vehicle.

As shown in the accompanying drawing figures, FIG. 1 illustrates a perspective view of the assembled super-chilled air induction apparatus in an operative environment in a motor vehicle.

Figure 2A:
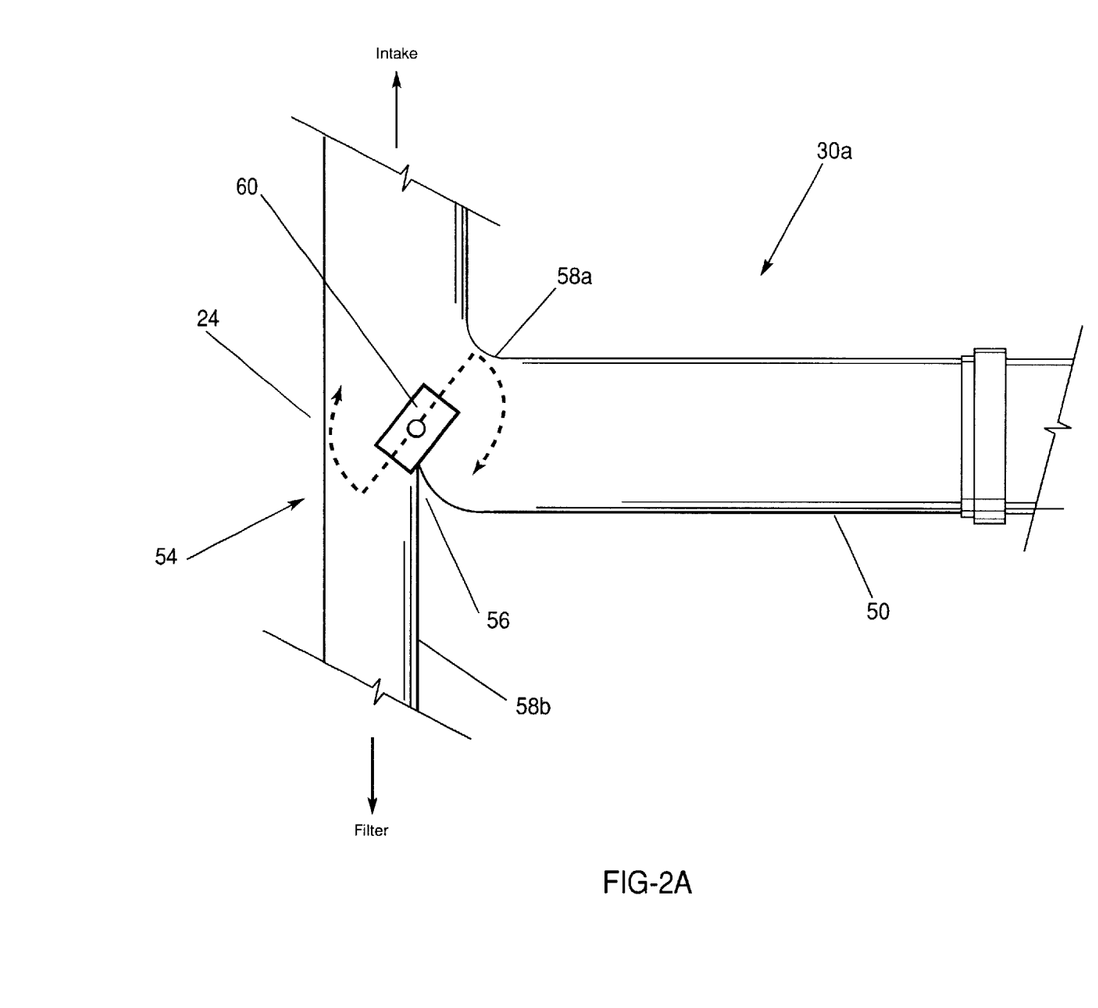
FIG. 2A is a top view of a portion of the plurality of pipes showing a single valve.
Figure 3A:
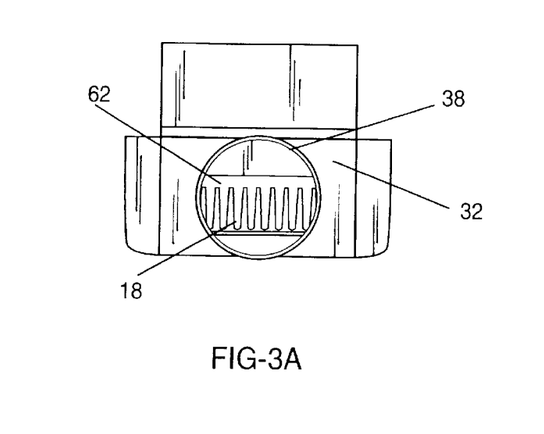
FIG. 3A is an end view of the housing of the present invention.
Figure 3B:
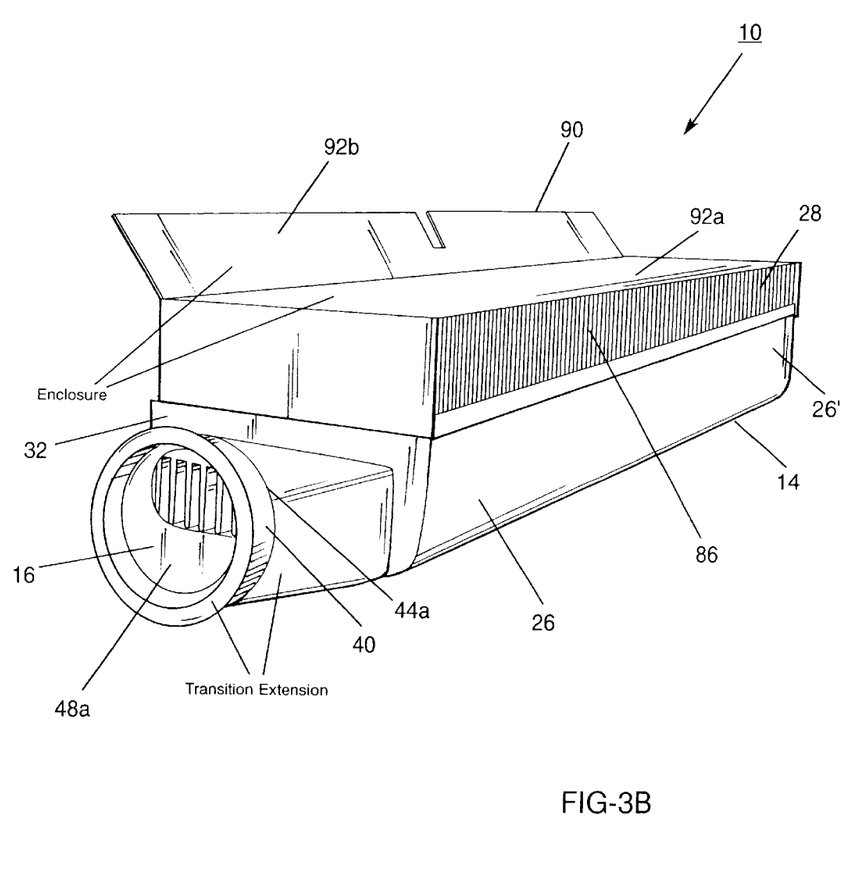
FIG. 3B is a perspective view of the present invention.
Figure 4:
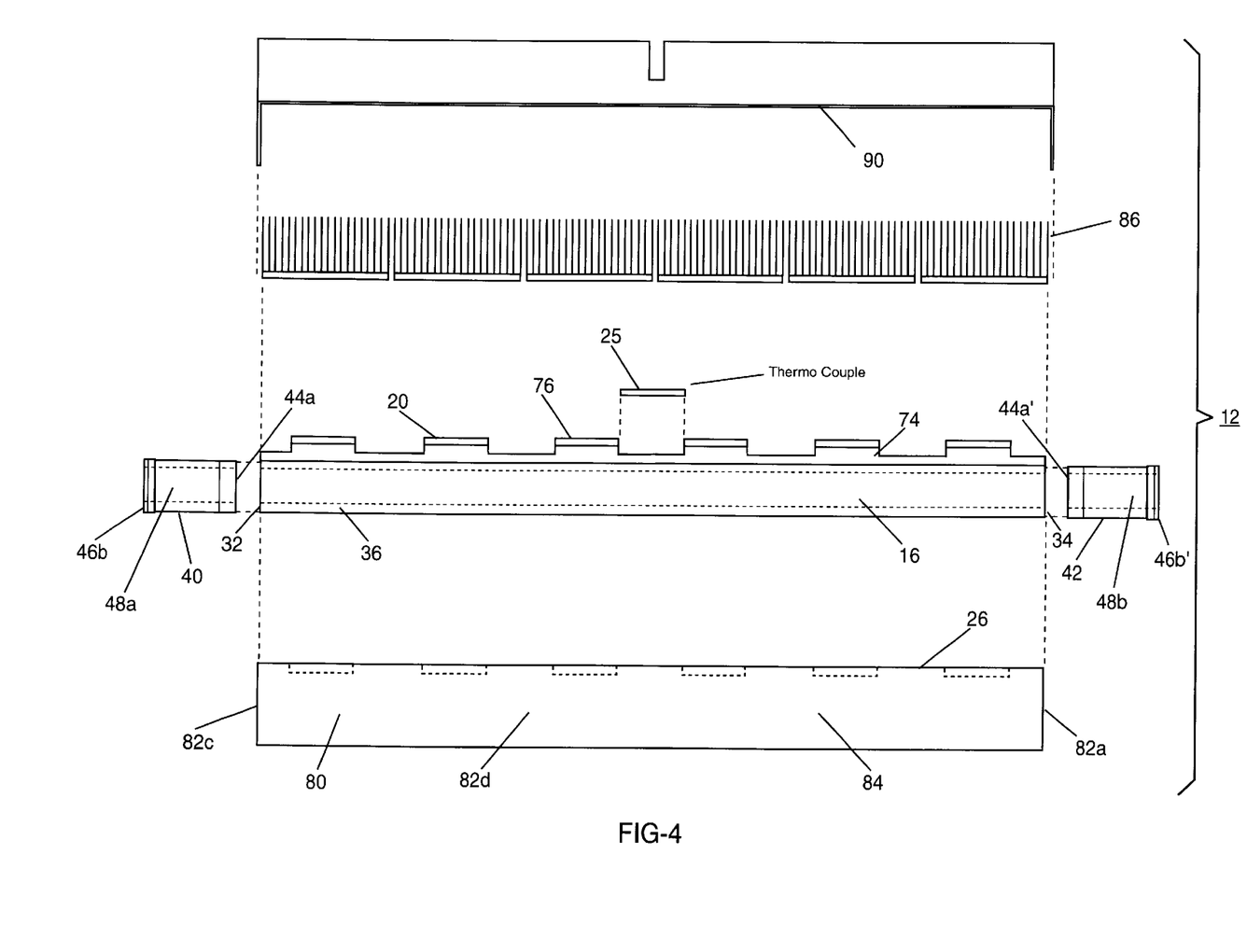
FIG. 4 is a side exploded view of components of the super-chilled air induction apparatus.
Figure 5A:
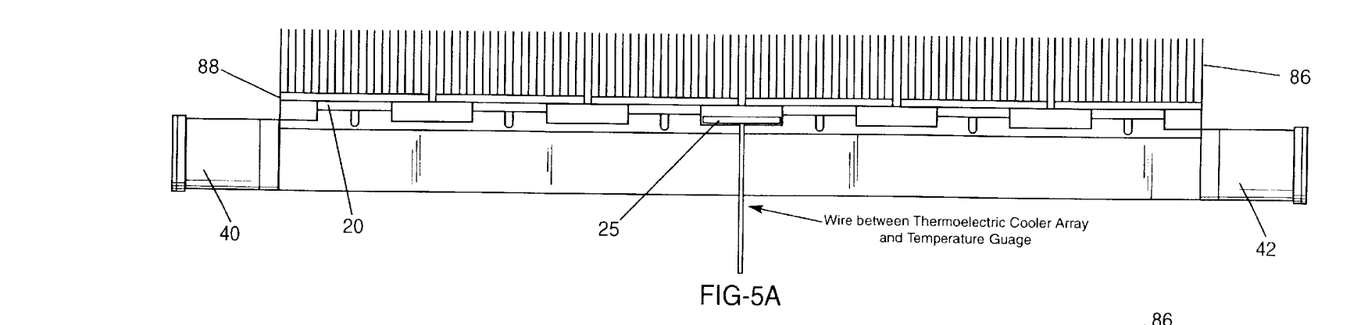
FIG. 5A is a side plan view of apparatus.
Figure 5B:
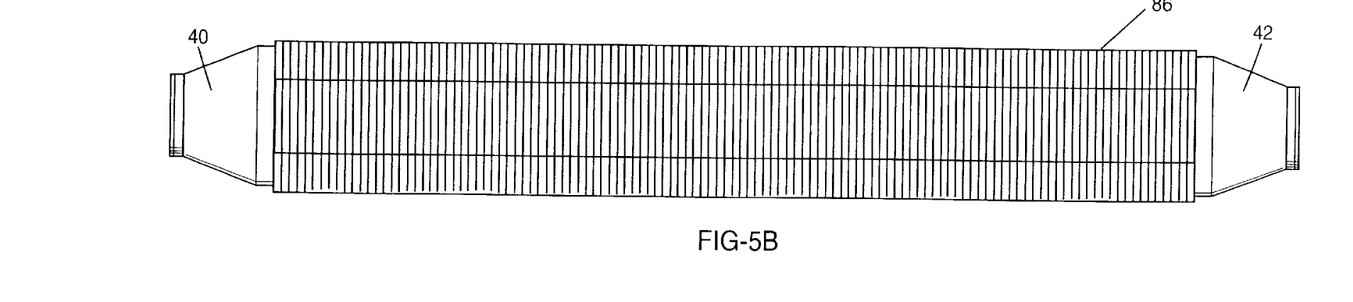
FIG. 5B is a top view of the apparatus.
Figure 5C:
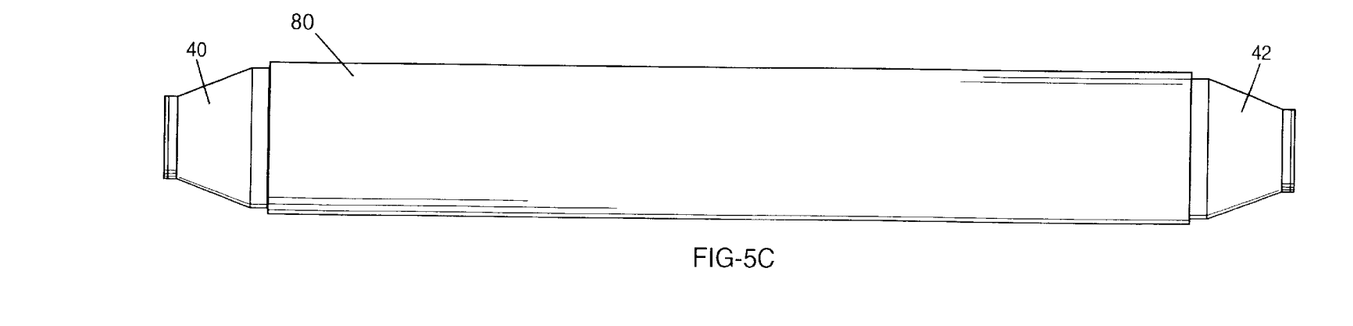
FIG. 5C is a bottom view of the apparatus.
Figure 6A:
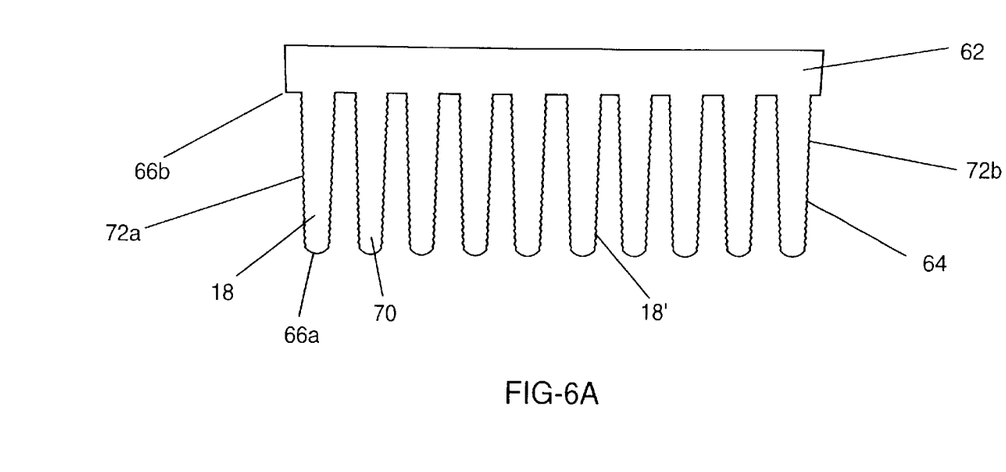
FIG. 6A is an end view of the fins.
Figure 6B:
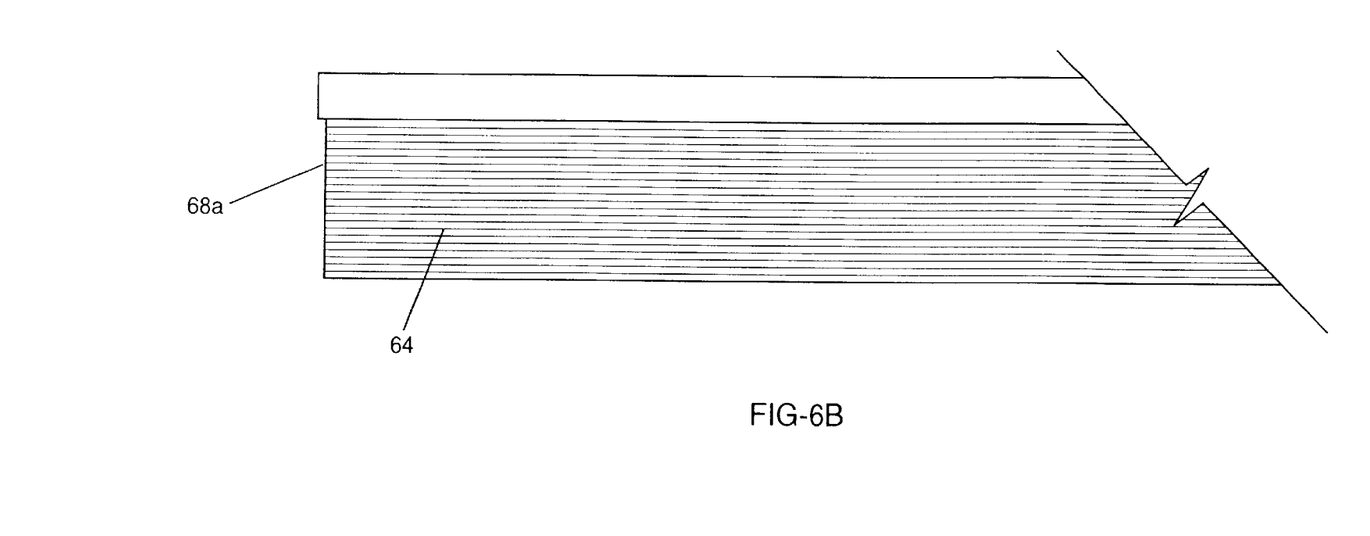
FIG. 6B is a side view of the heat sink.
Figure 6C:
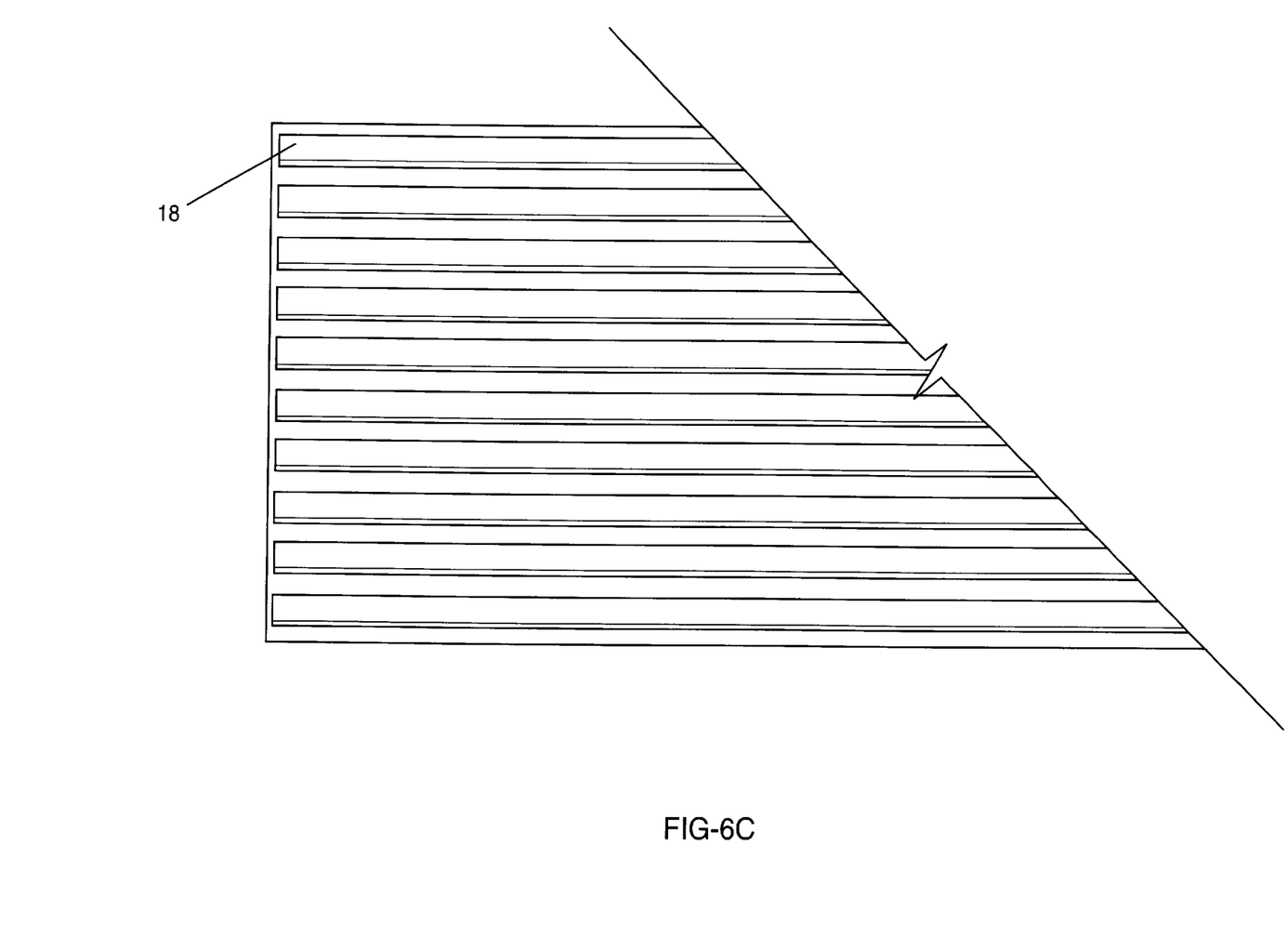
FIG. 6C is a top view of the heat sink.

Referring initially to FIG. 1, the super-chilled air induction apparatus is shown and generally designated 10. As shown, super-chilled air induction system 10 includes a thermoelectric cooling device 12. Thermoelectric cooling device 12 includes a housing 14. Housing 14 is formed with a passage 16 best shown by cross-reference between FIGS. 1 and 3B. Fins 18, as perhaps best shown by cross-reference between FIGS. 1, 3A and 6A, are insertable into passage 16. Thermoelectric coolers 20, as perhaps best shown by reference to FIG. 4, are operably attached to housing 14, and operably connected to a temperature gauge 22 and to a controller 23 shown diagrammatically in FIG. 1. At least one valve 24 is provided for regulating air flow in and through super-chilled air induction apparatus 10, as shown diagrammatically in FIG. 1, and in an alternative embodiment in FIG. 2A. Also included is an insulator 26 that surrounds thermoelectric cooling device 12, including housing 14, during operation. Insulator 26 is best shown in FIGS. 3B and 4. In addition, a heat sink 28 is positioned adjacent housing 14 to dissipate undesirable heat. Super-chilled air induction apparatus 10 may be connected to a plurality of pipes 30 that direct air through super-chilled air induction apparatus 10.

More specifically, super-chilled air induction apparatus 10, according to the present invention, includes thermoelectric cooling device 12 as best shown by cross-reference among FIGS. 1, 2A, 2B, 3A, 3B, and 4A–4C. In a preferred embodiment of the present invention, thermoelectric cooling device 12 includes passage 16. Passage 16 is formed to conduct air through thermoelectric cooling device 12. In the preferred embodiment of the invention, passage 16 preferably is substantially hollow. As indicated, passage 16 of cooling device is formed for conducting air.

Passage 16 of thermoelectric cooling device 12 is not, in a preferred embodiment, formed to conduct any other fluid.

Figure 2B:
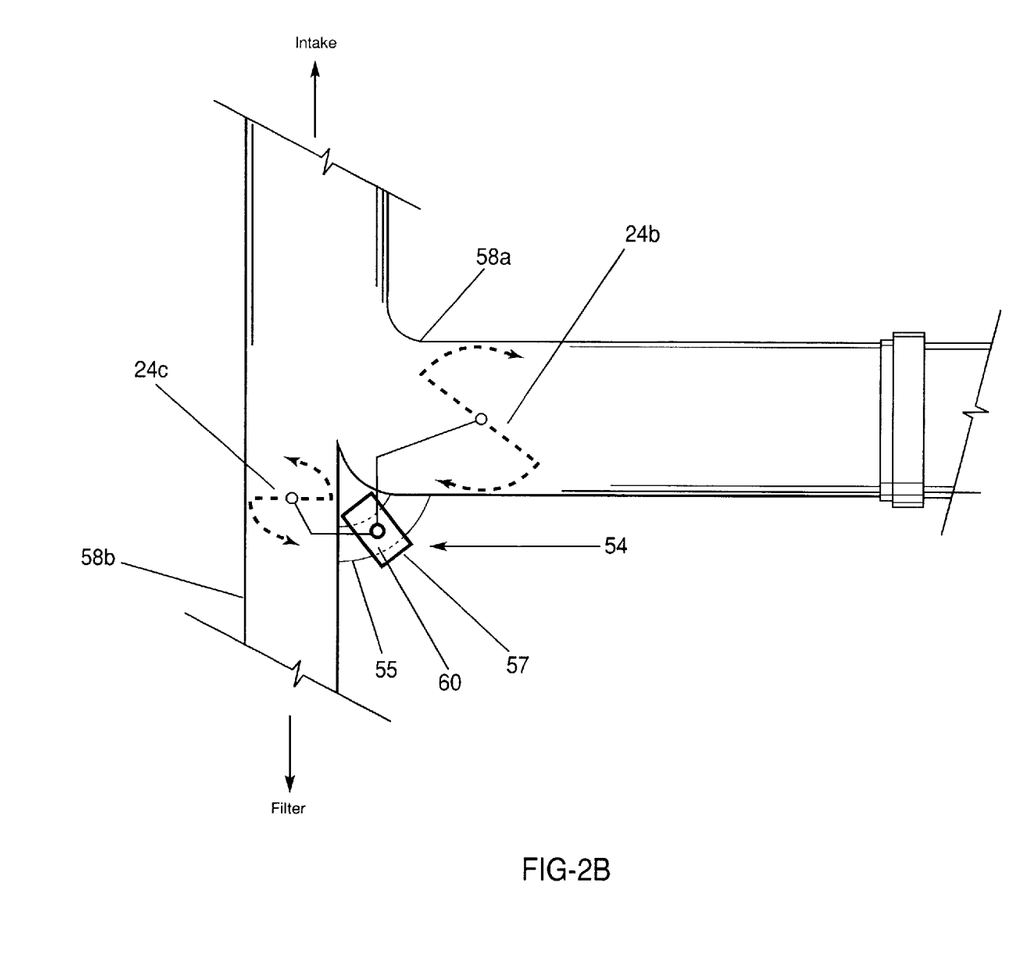
FIG. 2B is a top view of a portion of the plurality of pipes showing two valves.
Figure 2C:
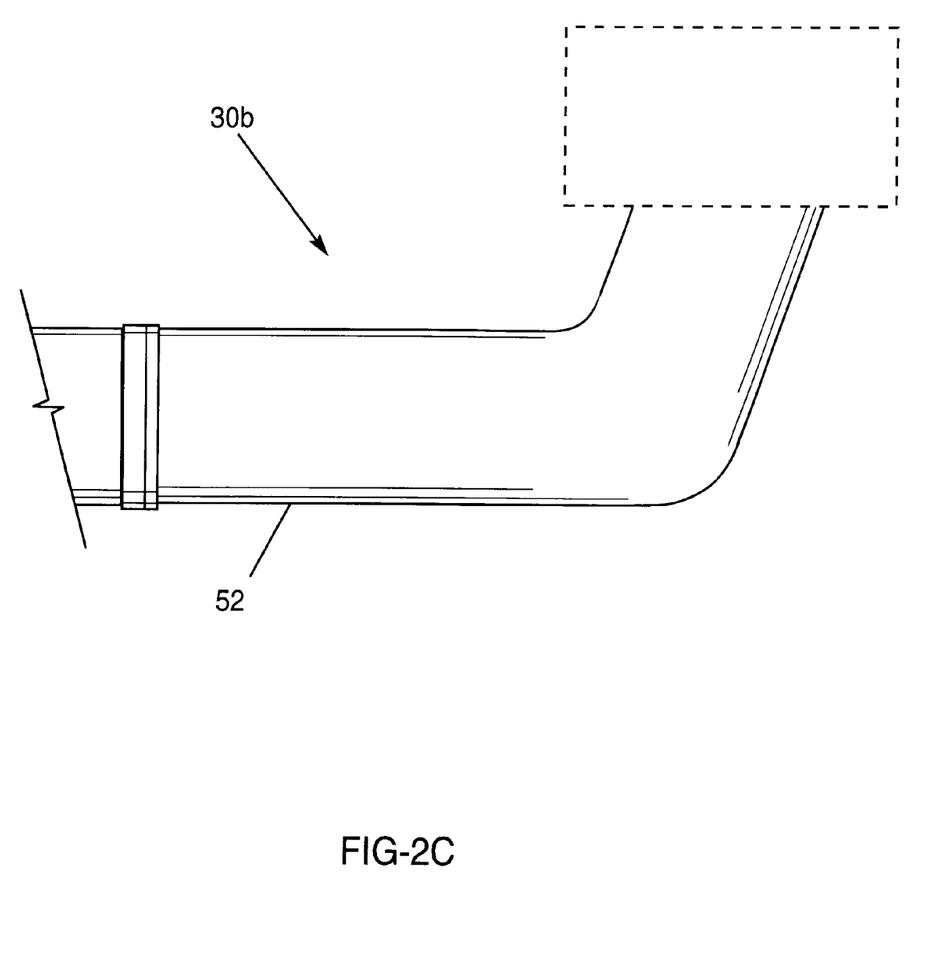
FIG. 2C is a top view of another portion of the plurality of pipes.

Thermoelectric cooling device 12 includes housing 14. As best shown in FIG. 3B and 4, housing 14 is formed with a proximal end 32, a distal end 34, an exterior surface 36, and an interior surface 38. Preferably, housing 14 is configured to have a substantially rectangular cross-section at substantially a right angle to the longitudinal axis of housing 14, but as a person skilled in the art will recognize, the configuration of housing 14 is not a limitation of the present invention. A preferred embodiment of the present invention also includes a first transition extension 40 and a second transition extension 42. First transition extension 40 is attached to proximal end 32 of housing 14, and second transition extension 42 is attached to distal end 34 of housing 14. First transition extension 40 and a second transition extension 42 are shown in FIGS. 1–3 as formed with a first end 44a and a second end 44b. First end 44a of first transition extension 40 is connected to proximal end 32 of housing 14, and first end 44a' of second transition extension 42 is attached to distal end 34 of housing 14. As shown, first transition extension 40 and second transition extension 42 are formed substantially as substantially hollow truncated pyramids, but as a person skilled in the art will recognize, the shape of first transition extension 40 and second transition extension 42 is not a limitation of the present invention. The mechanical advantages of first transition extension 40 and second transition extension 42 include the capability of providing a useful transitional interconnection between housing 14 and plurality of pipes 30a,b, as well as providing air flow through orifice 48a,b formed in substantially hollow truncated pyramids.

In a preferred embodiment of super-chilled air induction apparatus 10, super-chilled air induction apparatus 10 also includes plurality of pipes 30a,b as shown in FIG. 1. Plurality of hollow pipes 30a,b includes a first hollow pipe 50 connectable to one end of thermoelectric cooling device 12, and a second hollow pipe 52 also connectable to the other end of thermoelectric cooling device 54, as shown in FIG. 1. As also shown in FIGS. 1, 2A, and 2B, in a preferred embodiment of the present invention first hollow pipe 50 includes a bifurcated pipe segment 54 extending from first hollow pipe 50. An intersection 56 is formed between tube 58a and 58b of bifurcated pipe segment 54 extending from first hollow pipe 50. Means 60 for regulating the flow of air in super-chilled air induction apparatus 10 is provided. Means 60 includes at least one valve 24 as shown in FIG. 2A. In an alternative embodiment of the present invention, means 60 includes two valves 24b and 24c as shown in FIG. 2B. As shown by cross-reference between FIGS. 2A and 2B, a boom 55 may be attached to tubes 58a,b adjacent intersection 56. A servomechanism 57 is mounted on boom 55. In an alternative embodiment of the present invention, as shown best in FIG. 2B, valve 24 may include two valves 24a,b. As will be evident to one skilled in the art, valves 24a and 24b may be operated so that valve 24a is open when valve 24b is closed, thus contributing to regulating the flow of super-chilled air to an air-fuel mixture at the desired temperature. Servomechanism 57 is operably connectable to valves 24b and 24c as shown in FIG. 2B. As will be evident to one of ordinary skill in the art, means 60 in the form of at least one valve 24 or in the embodiment of two valves 24a and 24b, provides significant advantages over the current art in the industry. Valve 24 allows the user of the present invention to collect cooled air at a predetermined correct temperature, and then at the appropriate time to inject the super-chilled air into an air-fuel mixture at a temperature, and in an amount, needed, by opening and closing one or more valves 24. In one embodiment, servomechanism 57 for opening and closing valve 24, or valve combination 24a and 24b, may be mounted either on boom 55 or within plurality of pipes 30a,b. Servomechanism 57 allows a user or operator of the present invention to close or open valve 24a, or valve combination 24b and 24c, to allow super-chilled air to pass through passage 16 in housing 14 of thermoelectric cooling device 12 into an air-fuel mixture on demand by the user of the present invention. As also will be evident to one skilled in the art, however, the use of servo mechanism 57 is not a limitation of the present invention, and any mechanism for opening and closing valve 24a, or valve combination 24b and 24c, may be used instead of servomechanism 57. The term "servomechanism" as used in this document includes at least an automatic or regulatable device for static or dynamic regulation of a power input or output, using comparatively little force, to achieve correct operating conditions in super-chilled air induction apparatus 10.

Referring now to FIGS. 3A, 3B, 4, and 6, and to passage 16 in housing 14 of the present invention, a preferred embodiment of super-chilled air induction apparatus 10 includes one or more fins 18 in passage 16. Preferably, one or more fins 18 are monolithically formed to extend at a substantially right angle from a substrate 62, as best shown in FIG. 6A. Also in a preferred embodiment, one or more fins 18 include a number of grooves 64 incised in fins 18. More specifically, each of the one or more fins 18 are formed with opposing longitudinal edges 66, opposing vertical edges 68, a body 70 within opposing longitudinal edges 66a,b and opposing vertical edges 68a,b, and opposing sides 72a,b as best shown by cross-reference between FIGS. 6A and 6B. To add surface area for contributing to achieving and maintaining cold air within thermoelectric cooling device 12, a plurality of grooves 64 is formed in opposing sides 72a,b of fins 18 substantially coincident with the longitudinal axis through housing 14. Fins 18 are secured in substantially hollow passage 16 substantially coincident with the longitudinal axis through housing 14.

As shown in FIG. 4, housing 14 includes exterior surface 36. Also shown in FIG. 4 is the preferred embodiment of super-chilled air induction apparatus 10, showing thermoelectric cooling device 12 includes one or more spacer blocks 74. One or more spacer blocks 74 are disposed on exterior surface 36 of thermoelectric cooling device 12. One or more spacer blocks 74 contribute to controlling the temperature within thermoelectric cooling device 12, and also serve as a mounting platform for installation of at least one thermoelectric cooler 20 located on one or more spacer blocks 74. Array 76 of thermoelectric coolers 20 is operably connected to means 78 for determining temperature in super-chilled air induction apparatus 10 during operation. In a preferred embodiment of the present invention, means 78 for determining temperature in super-chilled air induction apparatus 10 is temperature gauge 22 shown in FIG. 1. Array 76 of thermoelectric coolers 20 is also operably connected to controller 23 as also shown in FIG. 1 and to a thermocouple 25, as best shown in FIG. 4. Thermocouple 25 is preferably a device for measuring temperature within passage 16 of housing 14 of, and is operably connectable to controller 23. Controller 23 may be any of a variety of means for operably controlling the process of directing the cooled air to the point of ignition, including one or more toggle switches or electronic modules (not shown).

As will be evident to one of ordinary skill in the art, array 76 of thermoelectric coolers 20 is a preferred but not exclusive configuration of thermoelectric cooling device 12 that may be used in connection with the present invention. As used in this document, the term "thermoelectric cooler," often referred to singulary as a "TEC," includes, but is not limited to, a solid-state heat pump that uses the Peltier cooling effect to move heat. Thermoelectric coolers currently consist of a number of p-type and n-type semiconductor couples connected electrically in series and thermally in parallel, but likely will have a variety of configurations in the future. The semiconductor couples are sandwiched between at least two thermally conductive and electrically insulated substrates. The heat pumping direction may be altered by altering the polarity of the charging current. TEC's frequently are used to cool below ambient temperature. Because thermoelectric devices have no moving parts, they are lightweight and reliable, create no electrical noise, and may be operated in virtually any environment. TEC's are able to control temperatures to plus-or-minus 0.1° C. Thermoelectric coolers are known to provide precise, simple, and convenient temperature control.

As shown in FIGS. 3B and 4, the present invention also includes insulator 26. Insulator 26 is, in a preferred embodiment, an insulating sleeve that surrounds and encloses housing 14 on which are disposed array 76 of spacer blocks 74 and thermoelectric coolers 20. Insulator 26 also is substantially sealed to help maintain the cooled temperature of the air in super-chilled air induction apparatus 10 during operation. In a preferred embodiment, insulator 26 is made of neoprene, but as a person skilled in the art will recognize, any of a number of alternative materials may be used to form insulator 26. In the preferred embodiment, a sheet 80 is configured from neoprene fabric having four opposing borders 82a–d and a lamina 84 between opposing borders 80a–d. Lamina 84 is shaped to envelope housing 14 and thermoelectric coolers 20 during operation of super-chilled air induction apparatus 10.

The present invention also includes heat sink 28 as best shown in FIGS. 1, 3B and 5A–5C. As shown, heat sink 28 includes a plurality of plates 86. Plurality of plates 86 contribute to dissipating heat from super-chilled air induction apparatus 10 during operation. Heat sink 28 is positioned adjacent housing 14. In a preferred embodiment of the present invention, heat sink 28 includes a container 88 for holding plurality of plates 86. Also included is an enclosure 90. Enclosure 90, as best shown in FIG. 1, covers portions of thermoelectric cooling device 20 and helps direct air across super-chilled air induction apparatus 10, as shown in FIG. 1, to assist in cooling operating components of the invention, including, for example, thermoelectric coolers 20. In a preferred embodiment of the present invention, enclosure 90 includes two peripherally rotatable members 92a,b. Peripherally rotatable member 92a may be rotated to cover plurality of plates 86, and peripherally rotatable member 92b may be positioned to direct air from a radiator fan 94, or other fan means (not shown), across super-chilled air induction apparatus 10, as shown in FIG. 1.

OPERATION

In operation, super-chilled air induction apparatus 10 is mounted adjacent a motor vehicle engine as suggested by FIG. 1, preferably between a grill or other apparatus for admitting air flow (not shown), and fan 94. Whenever an operator of the motor vehicle desires to increase horsepower and torque provided by the motor vehicle engine, the operator activates controller 23. Controller 23 causes thermoelectric coolers 20 mounted on housing 14 of thermoelectric device 12 to cool air entering at least one of plurality of pipes 30a,b. Fins 18 in passage 16 of housing 14 further cool incoming air. Enclosure 90 also directs air from fan 94 across super-chilled air induction apparatus 10, further cooling the intake air. Heat sink 28 further removes undesirable warm air from thermoelectric device 12. Insulator 26 contributes to maintaining the desired super-chilled air at it accumulates in super-chilled air induction apparatus 10. The operator of the motor vehicle may monitor the temperature of the air in super-chilled air induction apparatus 10 using temperature gauge 22. When temperature gauge 22 indicates that a desired cooling of intake air has been achieved, the operator may activate valve 24 to direct super-chilled air into the cylinders of the motor vehicle, providing the required torque and horsepower.

While the super-chilled air induction system shown in drawing FIGS. 1 through 6C is one embodiment of the present invention, it is merely one such embodiment of the invention, is not intended to be exclusive, and is not a limitation of the present invention. While the particular super-chilled air induction system as shown and disclosed in detail in this instrument is fully capable of obtaining the objects and providing the advantages stated, this disclosure is merely illustrative of the presently preferred embodiments of the invention, and no limitations are intended in connection with the details of construction, design or composition other than as provided and described in the appended claims.

Claim elements and steps in this document have been numbered solely as an aid in readability and understanding. The numbering is not intended to, and should not be considered as, intending to indicate the ordering or sequencing of elements and steps in the claims.

What is claimed is:

1. A super-chilled air induction apparatus, comprising:
   a plurality of hollow pipes;
   a thermoelectric cooling device connectable to the plurality of hollow pipes,
      wherein the thermoelectric cooling device includes a passage for conducting air;
   a valve mounted within at least one of the plurality of hollow pipes for regulating the flow of air in the apparatus;
   a heat sink adjacent the thermoelectric cooling device; and
   an insulator substantially enclosing the thermoelectric cooling device.

2. A super-chilled air induction apparatus as recited in claim 1, wherein the plurality of hollow pipes includes a first hollow pipe connectable to the thermoelectric cooling device.

3. A super-chilled air induction apparatus as recited in claim 2, wherein the plurality of hollow pipes includes a second hollow pipe connectable to the thermoelectric cooling device.

4. A super-chilled air induction apparatus as recited in claim 3, further comprising means for opening and closing the valve.

5. A super-chilled air induction apparatus as recited in claim 4, wherein the thermoelectric cooling device further comprises means operably connectable to the thermoelectric cooling device for determining the temperature of air within the passage.

6. A super-chilled air induction apparatus as recited in claim 5, wherein the thermoelectric cooling device further comprises one or more fins insertable into the passage.

7. A super-chilled air induction apparatus as recited in claim 6, wherein the thermoelectric cooling device further comprises one or more spacer blocks disposed on the thermoelectric cooling device.

8. A super-chilled air induction apparatus as recited in claim 7, wherein the thermoelectric cooling device further comprises at least one thermoelectric cooler located on the one or more spacer blocks.

9. A super-chilled air induction apparatus as recited in claim 8, further comprising a least one thermocouple installed on the thermoelectric cooling device.

10. A super-chilled air induction apparatus as recited in claim 9, wherein the at least one thermoelectric cooler is operably connectable to the temperature determining means and to the at least one thermocouple.

11. A super-chilled air induction apparatus as recited in claim 10, wherein the insulator is selected from the group of insulators consisting of neoprene, plastics, resins, fibers, rubber, and metal.

12. A system for providing cooled air for an air-fuel mixture of an internal combustion engine, comprising:
  a housing formed with a passage having a proximal end and a distal end,
    wherein the housing further includes one or more, grooved fins insertable into the passage;
  one or more thermoelectric coolers operably attachable to the housing;
  means combinable with the housing for regulating the flow of air in the system;
  means operably connectable to the one or more thermoelectric coolers for activating the flow of cooled air into the air-fuel mixture;
  an insulating sleeve surroundingly encloseable over the housing; and
  a heat sink positionable adjacent the housing.

13. A system for providing cooled air for an air-fuel mixture of an internal combustion engine as recited in claim 12, further comprising at least one spacer block locatable between the one or more thermoelectric coolers and the housing.

14. A system for providing cooled air for an air-fuel mixture of an internal combustion engine as recited in claim 12, further comprising opposing transition extensions attached to the proximal end and the distal end of the housing.

15. A system for providing cooled air for an air-fuel mixture of an internal combustion engine as recited in claim 12, wherein the flow of air regulating means is a valve.

16. A system for providing cooled air for an air-fuel mixture of an internal combustion engine as recited in claim 12, wherein the flow of cooled air activating means is a controller.

17. A system for providing cooled air for an air-fuel mixture of an internal combustion engine as recited in claim 12, further comprising an enclosure for directing air across the system.

18. A method for manufacturing a super-chilled air apparatus, comprising:
  shaping a housing for insertion of one or more fins;
  disposing one or more spacer blocks on the housing;
  locating one or more thermoelectric coolers on the one or more spacer blocks;
  attaching a first transition extension to one end of the housing;
  attaching a second transition extension to the other end of the housing;
  connecting the first transition extension to a first hollow pipe;
  connecting the second transition extension to a second hollow pipe;
  providing an insulator for encapsulating the housing;
  installing a valve in the first hollow pipe; and
  positioning a heat sink adjacent the housing.

19. A method for manufacturing a super-chilled air apparatus as recited in claim 18, wherein the housing shaping step includes the substeps of:
  including a substantially hollow passage through the housing for conveying air;
  configuring the substantially hollow passage to have a substantially rectangular cross-section at substantially a right angle to the longitudinal axis of the housing;
  forming the housing to have a proximal end, a distal end, an exterior surface, and an interior surface;
  constructing one or more fins to extend monolithically from a substrate, wherein the one or more fins have opposing longitudinal edges, opposing vertical edges, a body within the opposing longitudinal edges and opposing vertical edges, and opposing sides;
  incising at least one groove in at least one of the opposing sides of the one or more fins substantially coincident with the longitudinal axis through the housing; and
  securing the one or more fins in the substantially hollow passage.

20. A method for manufacturing a super-chilled air apparatus as recited in claim 19, wherein the housing shaping step further includes the substep of installing at least one thermocouple on the apparatus.

21. A method for manufacturing a super-chilled air apparatus as recited in claim 20, wherein the one or more spacer blocks disposing step includes the substep of disposing the spacer blocks on the exterior surface of the housing.

22. A method for manufacturing a super-chilled air apparatus as recited in claim 21, wherein the one or more thermoelectric coolers locating step includes the substep of operably connecting the one or more thermoelectric coolers to a temperature gauge.

23. A method for manufacturing a super-chilled air apparatus as recited in claim 22, further comprising a controller operably connectable to the one or more thermoelectric coolers for controlling the flow of super-chilled air from the system.

24. A method for manufacturing a super-chilled air apparatus as recited in claim 23, wherein the first transition extension attaching step includes the substeps of:
  constructing at one end the first hollow pipe a bifurcated pipe segment;
  mounting a boom across the bifurcated pipe segment;
  installing at least one servomechanism on the boom to contribute to opening and closing the valve; and
  connecting the other end of the first hollow pipe to a first end of the first transition extension.

25. A method for manufacturing a super-chilled air apparatus as recited in claim 24, wherein the bifurcated pipe segment is formed monolithically from the first hollow pipe.

26. A method for manufacturing a super-chilled air apparatus as recited in claim 25, wherein second transition extension connecting step includes the substep of connecting the second end of second transition extension to the second hollow pipe.

27. A method for manufacturing a super-chilled air apparatus as recited in claim 26, wherein the insulator providing step includes the substeps of:

selecting a material for the insulator;

configuring from the material a sheet having four opposing borders and a lamina therebetween;

shaping the lamina to envelope the housing and thermoelectric coolers; and securing the four opposing borders to encapsulate the lamina around the housing and thermoelectric coolers.

28. A method for manufacturing a super-chilled air apparatus as recited in claim 27, wherein the heat sink positioning step includes the substeps of:

shaping a container for holding a plurality of plates;

forming a plurality of plates;

installing the plurality of plates in the container;

including an enclosure above the plurality of plates;

positioning the container adjacent the housing;

operably connecting the heat sink to a temperature gauge; and positioning the enclosure for directing air from a fan across the super-chilled air apparatus.

29. An apparatus for providing cooled air to an engine, comprising:

a housing,
wherein the housing includes a plurality of fins;

means attachable to the housing for cooling air;

means connectable to the housing for regulating the flow of air through the apparatus;

means for insulating the cooling air means; and means positionable adjacent the housing for dissipating heat.

30. An apparatus for providing cooled air to an engine as recited in claim 29, wherein the housing includes a substantially hollow passage for transporting air having a proximal end and a distal end.

31. An apparatus for providing cooled air to an engine as recited in claim 29, wherein the plurality of fins is formed with a plurality of grooves having a direction coincident with a longitudinal axis through the housing.

32. An apparatus for providing cooled air to an engine as recited in claim 29, wherein the cooling air means includes one or more spacer blocks disposed on the housing.

33. An apparatus for providing cooled air to an engine as recited in claim 32, wherein the cooling air means includes one or more thermoelectric coolers positionable on the one or more spacer blocks.

34. An apparatus for providing cooled air to an engine as recited in claim 33, wherein the one or more thermoelectric coolers is operably connectable to a temperature gauge.

35. An apparatus for providing cooled air to an engine as recited in claim 29, wherein the cooling air means includes a first transition extension monolithically securable to the housing.

36. An apparatus for providing cooled air to an engine as recited in claim 35, wherein the cooling air means includes a second transition extension monolithically securable to the housing.

37. An apparatus for providing cooled air to an engine as recited in claim 36, wherein the cooling air means includes a first hollow pipe.

38. An apparatus for providing cooled air to an engine as recited in claim 37, wherein the cooling air means includes a bifurcated pipe segment attached to the first transition extension.

39. An apparatus for providing cooled air to an engine as recited in claim 36, wherein the cooling air means includes a second hollow pipe attached to the second transition extension.

40. An apparatus for providing cooled air to an engine as recited in claim 29, wherein the flow of air regulating means includes at least one valve installed in the cooling air means.

41. An apparatus for providing cooled air to an engine as recited in claim 29, wherein the insulating means is a substantially sealed envelope of neoprene.

42. An apparatus for providing cooled air to an engine as recited in claim 29, wherein the dissipating heat means includes a container for holding a plurality of plates positioned adjacent the cooling air means.

* * * * *